(12) United States Patent
Katsuyama et al.

(10) Patent No.: US 8,223,254 B2
(45) Date of Patent: Jul. 17, 2012

(54) CAMERA BODY

(75) Inventors: Norikazu Katsuyama, Osaka (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 12/601,637

(22) PCT Filed: May 27, 2008

(86) PCT No.: PCT/JP2008/001320
§ 371 (c)(1),
(2), (4) Date: Nov. 24, 2009

(87) PCT Pub. No.: WO2008/146486
PCT Pub. Date: Dec. 4, 2008

(65) Prior Publication Data
US 2010/0171868 A1  Jul. 8, 2010

(30) Foreign Application Priority Data

May 28, 2007 (JP) .................. 2007-140955
Aug. 29, 2007 (JP) .................. 2007-222394

(51) Int. Cl.
*H04N 5/232* (2006.01)
(52) U.S. Cl. ........................................ 348/345
(58) Field of Classification Search .............. 348/345
See application file for complete search history.

(56) References Cited

U.S. PATENT DOCUMENTS

| 6,130,417 A | 10/2000 | Hashimoto |
| 2001/0026683 A1 | 10/2001 | Morimoto et al. |
| 2006/0210265 A1* | 9/2006 | Adachi .................. 396/374 |
| 2007/0014562 A1* | 1/2007 | Higuma et al. ........... 396/133 |
| 2010/0328515 A1* | 12/2010 | Ito ........................ 348/333.08 |

FOREIGN PATENT DOCUMENTS

| JP | 11-084228 A | 3/1999 |
| JP | 2000-075197 A | 3/2000 |
| JP | 2000-098474 A | 4/2000 |
| JP | 2000-121918 A | 4/2000 |
| JP | 2001-125173 A | 5/2001 |
| JP | 2001-272593 A | 10/2001 |
| JP | 2001-305419 A | 10/2001 |
| JP | 2003-029135 A | 1/2003 |
| JP | 2003-043344 A | 2/2003 |
| JP | 2004-109864 A | 4/2004 |
| JP | 2004-219581 A | 8/2004 |
| JP | 2006-259113 A | 9/2006 |

OTHER PUBLICATIONS

International Search Report of PCT/JP2008/001320, mailed on Aug. 26, 2008.

* cited by examiner

*Primary Examiner* — James Hannett
(74) *Attorney, Agent, or Firm* — Panasonic Patent Center; Dhiren Odedra; Kerry Culpepper

(57) ABSTRACT

A camera system includes an interchangeable lens and a camera body. The camera body includes an imaging unit, a contrast detection unit, a defocusing amount detection unit, and a body microcomputer. The contrast detection unit is configured to detect a contrast value from an image signal of a subject acquired by the imaging unit, and is configured to detect the focal state of an optical image on the basis of the contrast value. The defocusing amount detection unit is configured to detect the focal state of the optical image by phase difference detection method. The body microcomputer is configured to select either the contrast detection unit or the defocusing amount detection unit on the basis of lens information on the interchangeable lens side.

2 Claims, 13 Drawing Sheets

| Type of interchangeable lens | Lens information | | Determination processing by camera body | |
|---|---|---|---|---|
| | Format | Contrast detection method compatibility information | Contrast detection method compatibility determination | Selectable focal detection method |
| Type A | A | 1: compatible | ○ | phase difference detection method, contrast detection method |
| Type B | B | 0: incompatible | × | phase difference detection method |

Fig. 3

CAMERA BODY

CROSS-REFERENCE TO RELATED APPLICATIONS

This U.S. National stage application claims priority under 35 U.S.C. §119(a) to Japanese Patent Application No. 2007-140955 filed in Japan on May 28, 2007 and Japanese Patent Application No. 2007-333394 filed in Japan on Aug. 29, 2007, the entire contents of which are hereby incorporated herein by reference.

TECHNICAL FIELD

The technology disclosed herein relates to a camera system, and more particularly to a single lens reflex digital camera.

BACKGROUND ART

Single lens reflex digital cameras have rapidly grown in popularity in recent years. With these single lens reflex digital cameras, when a subject is observed through an optical viewfinder, the light incident on the imaging optical system is reflected by a reflecting mirror disposed along the optical path, and is guided to the viewfinder optical system. As a result, the subject image is converted by a pentaprism or the like into an erect image and guided to the viewfinder optical system. This allows the user to view the subject image formed by the imaging optical system through the optical viewfinder. Thus, the reflecting mirror is usually disposed along the optical path.

Meanwhile, when an optical image of the subject is converted into an image signal, the reflecting mirror is retracted from the optical path so that the light from the imaging optical system will be incident on an imaging element. As a result, opto-electric conversion is performed by the imaging element, and image data about the subject is obtained. When imaging is complete, the reflecting mirror is returned to its home position along the optical path. With a single-lens reflex camera, this operation of the reflecting mirror is the same regardless of whether the camera is a conventional silver halide camera or a digital camera.

However, when the home position of the reflecting mirror lies in the optical path, the light from the imaging optical system is not incident on the imaging element. Therefore, in the case of a digital camera, a monitor photography mode, in which the user uses a liquid crystal monitor to view the subject, is not possible, and a camera system such as this is inconvenient for a beginner unaccustomed to photography.

In view of this, a single-lens reflex digital camera has been proposed with which a liquid crystal monitor can be used during image capture (see Patent Citation 1, for example). With this camera system, in monitor photography mode, the reflecting mirror is retracted from the optical path and the light from the imaging optical system is incident on the imaging element. This allows the subject to be viewed on the liquid crystal monitor.

Patent Citation 1: Japanese Laid-Open Patent Application 2001-125173

DISCLOSURE OF INVENTION

With a conventional single lens reflex digital camera, phase difference detection is employed, for example, as the autofocus (AF) mode. With phase difference detection, light from the imaging optical system is guided to a focal detection unit by a sub-mirror provided to the reflecting mirror, and the amount of defocus is detected. Focal adjustment is performed automatically by driving the focus lens group according to this defocus amount.

However, when the autofocus method is phase difference detection, even in monitor photography mode in which a liquid crystal monitor is used, when focal adjustment is performed the reflecting mirror first has to be placed along the optical path and the light has to be guided to the focal detection unit.

Meanwhile, if the reflecting mirror is placed in the optical path, the optical path to the imaging element is blocked, and the video display being shown on the liquid crystal monitor is interrupted every time focal adjustment is performed. Accordingly, there is the risk that the user may lose sight of the subject and miss a photography opportunity during focal adjustment.

Thus, conventional camera systems were not convenient to use in monitor photography mode.

It is an object of the technology disclosed herein to improve the convenience of monitor photography mode in a camera system.

The camera system according to a first aspect is a camera system for photographing a subject, comprising an interchangeable lens and a camera body. The interchangeable lens includes an imaging optical system, a focal adjuster, and a lens controller. The imaging optical system is configured to form an optical image of the subject. The focal adjuster is configured to optically adjust the focal state of the optical image. The lens controller is configured to control the operation of the focal adjuster. The camera body includes an imaging unit, a first focal detector, a second focal detector, and a body controller. The imaging unit is configured to convert an optical image of a subject into an image signal. The first focal detector is configured to detect a contrast value from the image signal and is configured to detect the focal state of the optical image on the basis of the contrast value. The second focal detector is configured to detect the focal state of the optical image by phase difference detection method on the basis of the optical image. The body controller is configured to control the operation of the imaging unit. The body controller is configured to send and receive information to and from the lens controller. The lens controller has lens information related to the interchangeable lens. The body controller includes a determination part and a selector. The determination part is configured to determine whether or not the focal adjuster is compatible with the first focal detector on the basis of the lens information. The selector is configured to select either the first or second focal detector on the basis of the determination result of the determination part.

This camera system includes a first focal detector that performs focal detection by what is called a contrast detection method, and a second focal detector is configured to perform focal detection by what is called a phase difference detection method. The selector of the body controller is configured to select either the first or second focal detector on the basis of whether or not the focal adjuster is compatible with the first focal detector. Accordingly, when the interchangeable lens is compatible with a contrast detection method, the first focal detector can be selected as the focal detector installed in the camera body. As a result, there is no need for a reflecting mirror to be disposed in the optical path during focal adjustment as with a phase difference detection method. Consequently, in monitor photography mode, in which the subject is viewed on a liquid crystal monitor, focal adjustment can be performed without a video image of the subject being interrupted, and this improves the convenience of the monitor photography mode.

The camera system according to a second aspect is the camera system according to the first aspect, wherein, if the determination part determines that the focal adjuster is not compatible with the first focal detector, the selector is configured to select the second focal detector.

The camera system according to a third aspect is the camera system according to the second aspect, wherein the focal adjuster includes a focus lens group included in the imaging optical system, and a position detector configured to detect the position of the focus lens group. The lens information includes one or more of the following: information for identifying the interchangeable lens, information related to whether or not there is a lens shift tolerance range for the focus lens group, and information related to the specifications of the position detector.

The camera system according to a fourth aspect is the camera system according to the third aspect, wherein the position detector includes an absolute position detector configured to detect the position of the focus lens group with respect to a movable range, and a relative position detector configured to detect the movement amount and movement direction of the focus lens group. The relative position detector is configured to detect the movement direction of the focus lens group. When the first focal detector is used for focal adjustment, the focal adjustment is performed on the basis of only the information obtained by the relative position detector, out of the information obtained by the absolute position detector and the relative position detector.

The camera system according to a fifth aspect is the camera system according to the fourth aspect, wherein the camera body further includes an operation unit that is connected to the body controller and that allows information to be inputted from the outside. When the determination part determines that the focal detector is compatible with the first focal detector, the selector selects either the first or second focal detector on the basis of the information inputted from the operation unit.

The camera system according to a sixth aspect is the camera system according to the first aspect, wherein the focal adjuster includes a focus lens group included in the imaging optical system, and a position detector configured to detect the position of the focus lens group. The selector is configured to select the first focal detector when the focus lens group has a lens shift tolerance range that allows movement back and forth in the optical axis direction beyond the standard range from the nearest focal position to the infinity focal position.

The camera system according to a seventh aspect is the camera system according to the first aspect, wherein the focal adjuster includes a focus lens group included in the imaging optical system, and a position detector configured to detect the position of the focus lens group. The selector selects the first focal detector when the focus lens group has a lens shift tolerance range that allows movement back and forth in the optical axis direction beyond the standard range from the nearest focal position to the infinity focal position, and position detector of the interchangeable lens is configured to determine the movement direction of the focus lens.

The camera system according to an eighth aspect is the camera system according to the first aspect, wherein the focal adjuster includes a focus lens group included in the imaging optical system, and a position detector configured to detect the position of the focus lens group. The selector selects the first focal detector when the focus lens group has a lens shift tolerance range that allows movement back and forth in the optical axis direction beyond the standard range from the nearest focal position to the infinity focal position, and the position detector is a two-phase encoder.

The camera system according to a ninth aspect is the camera system according to the first aspect, wherein, if the determination part determines that the focal adjuster is compatible with the first focal detector, the selector selects the first focal detector, regardless of whether or not the photography mode is a monitor photography mode.

The camera system according to a tenth aspect is the camera system according to the first aspect, wherein, if the determination part determines that the focal adjuster is compatible with the first focal detector, and if the photography mode is a monitor photography mode, a quick return mirror is retracted from the optical path of the imaging optical system.

The camera system according to an eleventh aspect is used in a camera system for capturing an image of a subject and allows the attachment of an interchangeable lens having an imaging optical system. This camera body comprises an imaging unit, a first focal detector, a second focal detector, and a body controller. The imaging unit is configured to convert an optical image of the subject into an image signal. The first focal detector is configured to detect a contrast value from the image signal and is configured to detect the focal state of the optical image on the basis of the contrast value. The second focal detector is configured to detect the focal state of the optical image by phase difference detection method on the basis of the optical image. The body controller is configured to control the operation of the imaging unit. The interchangeable lens includes an imaging optical system, a focal adjuster, and a lens controller. The imaging optical system is configured to form an optical image of the subject. The focal adjuster is configured to optically adjust the focal state of the optical image. The lens controller is configured to control the operation of the focal adjuster. The body controller is configured to send and receive information to and from the lens controller. The lens controller has lens information related to the interchangeable lens. The body controller includes a determination part and a selector. The determination part determines whether or not the focal adjuster is compatible with the first focal detector on the basis of the lens information. The selector is configured to select either the first or second focal detector on the basis of the determination result of the determination part.

BRIEF DESCRIPTION OF THE DRAWINGS

FIG. 3 is a diagram illustrating an example of determination processing performing by the camera body and lens information;

Figure 1:
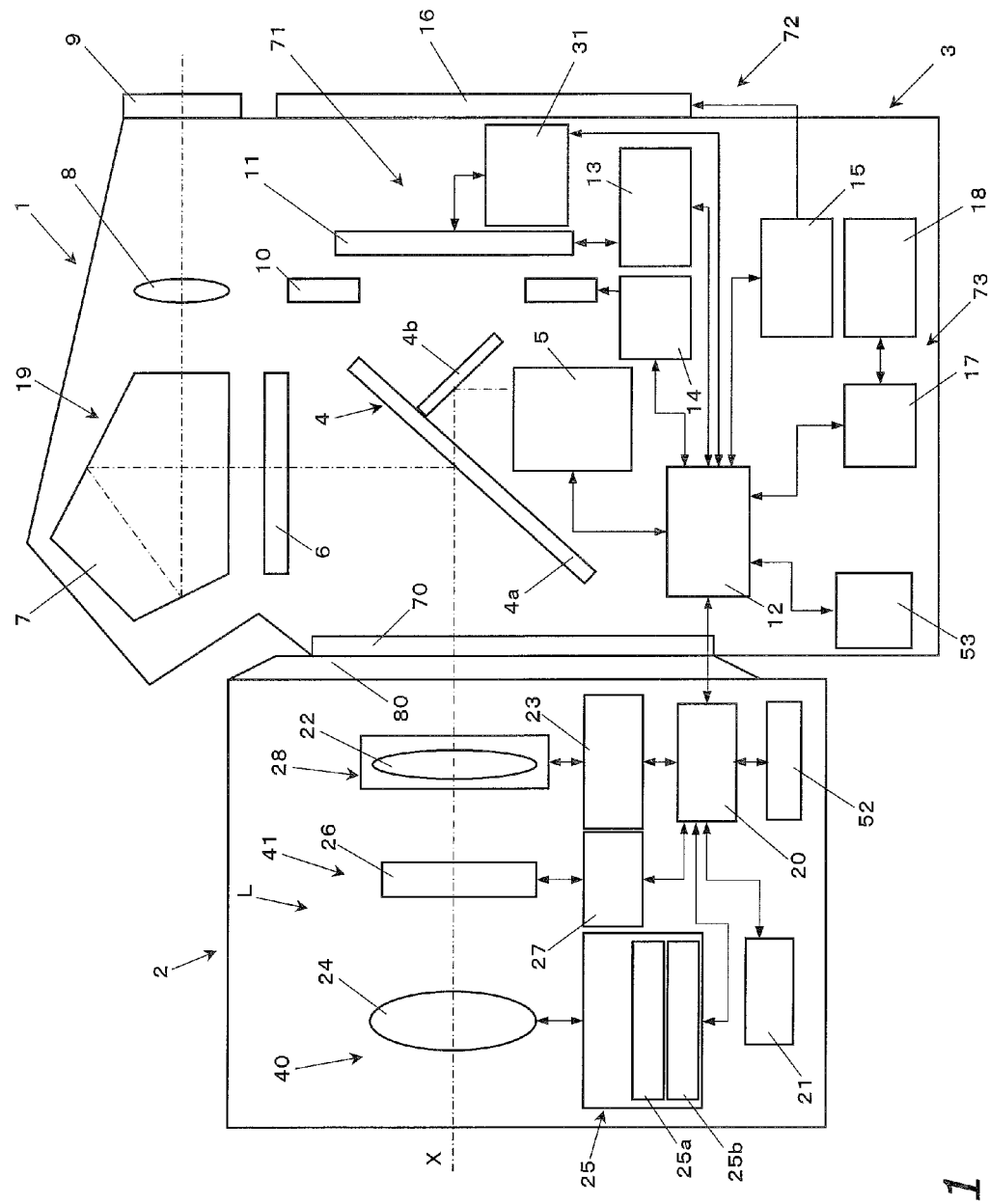
FIG. 1 is an overall diagram of the constitution of a camera system 1.

EXPLANATION OF REFERENCE 1 single lens reflex camera system
2 interchangeable lens
3 camera body
4 quick return mirror
5 defocusing amount detection unit (second focal detector)
12 body microcomputer (body controller)
20 lens microcomputer (lens controller)
24 focus lens group
25 focus lens group controller
25a linear position sensor (absolute position detector)
25b encoder (relative position detector)
31 contrast detection unit (first focal detector)
45 determination part
46 selector
71 imaging unit
72 image display unit
73 image storage unit

BEST MODE FOR CARRYING OUT THE INVENTION

The camera system according to the present application will now be described through reference to the drawings. Components that have substantially the same function will be numbered the same and redundant descriptions will be omitted.

The subject side of the camera body will be referred to as the front in this text, and corresponds to the left direction in FIG. 1, for example. The opposite side of the camera body from the subject, that is, the imaging element side with respect to the imaging optical system, will be referred to as the rear, and corresponds to the right direction in FIG. 1. The direction corresponding to upward in the vertical direction of a captured image when the lengthwise direction of the captured image is horizontal will be referred to as the upper side, and corresponds to the up direction in FIG. 1. Usually, the side where the release button is disposed on the camera body corresponds to the upper side. The opposite direction from the upper side will be referred to as the lower side, and corresponds to the down direction in FIG. 1. The faces of the various components on the front, rear, upper, and lower sides will be referred to as the front face, rear face, upper face, and lower face, respectively.

1: Overall Configuration of Single Lens Reflex Camera System

Figure 2:
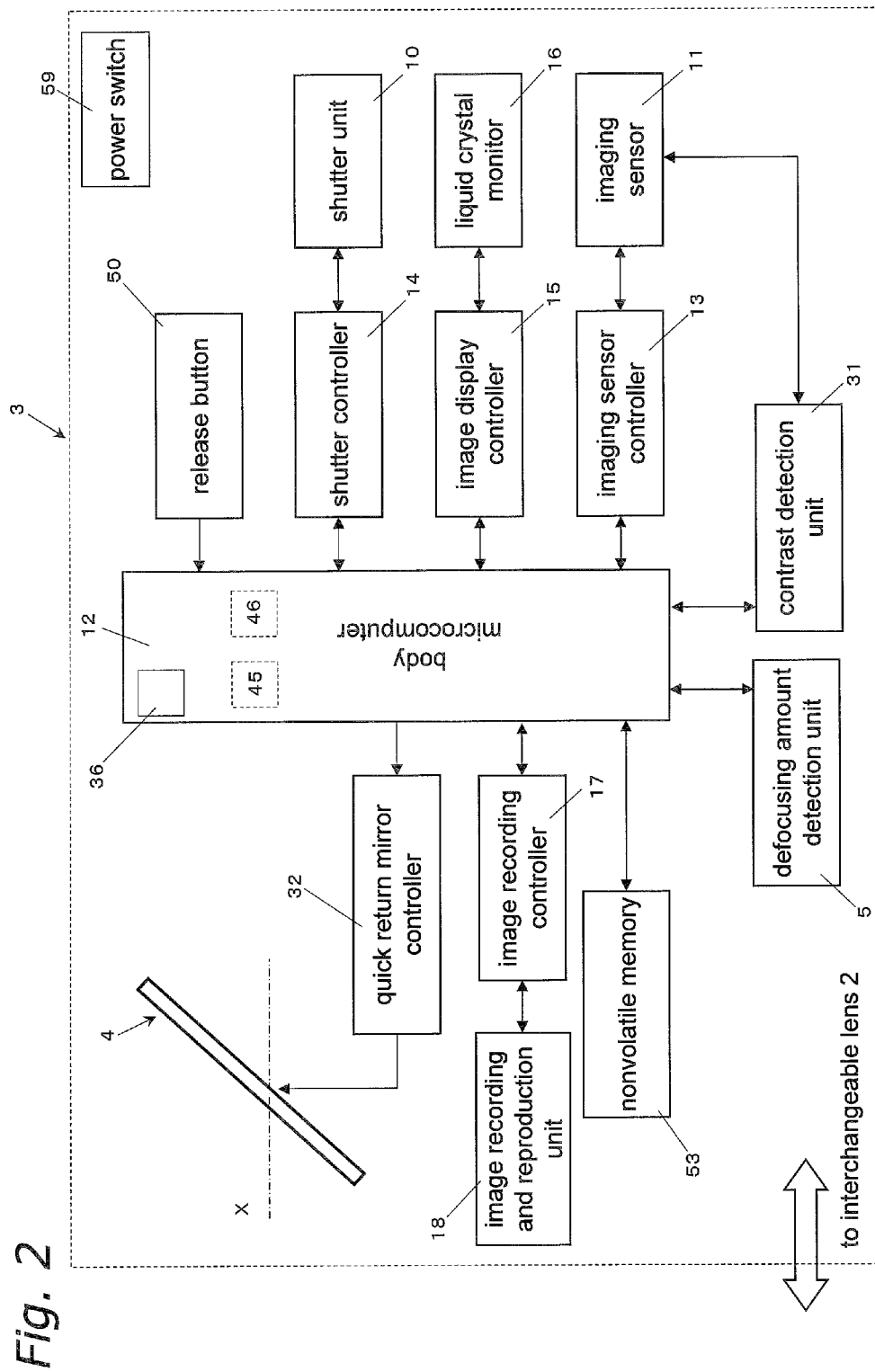
FIG. 2 is a simplified diagram of the constitution of a camera body 3.

The camera system according to the first embodiment of the present application will be described through reference to FIGS. 1 and 2. FIG. 1 is an overall diagram of the constitution of a camera system 1, and FIG. 2 is a simplified diagram of the constitution of a camera body 3.

As shown in FIG. 1, the camera system 1 is a system used in an interchangeable lens type of single lens reflex digital camera, and mainly comprises a camera body 3 having the primary function of the camera system 1, and an interchangeable lens 2 that is removably attached to the camera body 3. The interchangeable lens 2 is mounted on a lens mount 70 provided to the front face of the camera body 3.

1.1: Camera Body

The camera body 3 mainly comprises an imaging unit 71 for forming an image of a subject, a body microcomputer 12 serving as a body controller for controlling the operation of the various components such as the imaging unit 71, an image display unit 72 for displaying the captured image and various kinds of information, an image holder 73 for holding image data, a viewfinder optical system 19 through which the subject can be seen, and a nonvolatile memory 53. The camera body 3 has a contrast detection unit 31 serving as a first focal detector, and a defocusing amount detection unit 5 serving as a second focal detector, so as to afford compatibility with two kinds of autofocusing function.

The imaging unit 71 mainly comprises a quick return mirror 4 for guiding incident light to the viewfinder optical system 19 and the defocusing amount detection unit 5, an imaging sensor 11 such as a CCD for performing opto-electric conversion, a shutter unit 10 for adjusting the exposure state of the imaging sensor 11, a shutter controller 14 for controlling the drive of the shutter unit 10 on the basis of a control signal from the body microcomputer 12, and an imaging sensor controller 13 for controlling the operation of the imaging sensor 11.

The body microcomputer 12 is a control device serving as the functional center of the camera body 3, and controls various sequences. More specifically, the body microcomputer 12 is equipped with a CPU, ROM, and RAM, and the body microcomputer 12 can perform many different functions when programs held in the ROM are read into the CPU. For instance, the body microcomputer 12 has the function of detecting that the interchangeable lens 2 has been mounted on the camera body 3, the function of automatically selecting whether to use the contrast detection unit 31 or the defocusing amount detection unit 5, and so on. As shown in FIG. 1, the body microcomputer 12 is connected to the various components provided to the camera body 3.

The image display unit 72 comprises a liquid crystal monitor 16 for image display, and an image display controller 15 for controlling the operation of the liquid crystal monitor 16. The image holder 73 comprises an image recording and reproduction unit 18 for recording and reproducing captured images to and from a card-type recording medium (not shown), for example, and an image recording controller 17 for controlling the operation of the image recording and reproduction unit 18.

The quick return mirror 4 comprises a main mirror 4a capable of reflecting and transmitting incident light, and a sub-mirror 4b that is provided on the rear face side of the main mirror 4a and reflects transmitted light from the main mirror 4a, and can be flipped up outside the optical path X by a quick return mirror controller 32. This incident light is split into two beams by the main mirror 4a, and the reflected beam is guided to the viewfinder optical system 19. The transmitted beam, meanwhile, is reflected by the sub-mirror 4b and utilized as an autofocusing light beam by the defocusing amount detection unit 5 (discussed below). During normal photography, the quick return mirror 4 is flipped up outside the optical path X by the quick return mirror controller 32, and the shutter unit 10 is opened, so that an image of the subject is formed on the imaging face of the imaging sensor 11. When photography is not in progress, as shown in FIG. 1, the quick return mirror 4 is disposed in the optical path X, and the shutter unit 10 is closed.

The contrast detection unit 31 is used for detecting the focal state by what is called a contrast detection method, and detects a contrast value with respect to the position of a focus lens group 24 from an image signal obtained by the imaging sensor 11. The body microcomputer 12 calculates the focal position on the basis of the contrast value detected by the contrast detection unit 31.

Meanwhile, the defocusing amount detection unit 5 is used for detecting the focal state by what is called a phase difference detection method, and detects the focal position on the basis of light reflected by the sub-mirror 4b. With this camera system 1, either the contrast detection unit 31 or the defocusing amount detection unit 5 is automatically selected at the time of image capture according to the specifications of the interchangeable lens 2. The automatic selection of the focal detection unit will be discussed below.

The viewfinder optical system 19 comprises a viewfinder screen 6 where an image of the subject is formed, a pentaprism 7 for converting the subject image into an erect image, an eyepiece lens 8 for guiding the erect image of the subject to a viewfinder window 9, and the viewfinder window 9 through which the user can see the subject.

As shown in FIG. 2, the camera body 3 is provided with a power switch 59 for switching the power on and off to the camera system 1, and a release button 50 operated by the user during focusing and release. When the power switch 59 is used to turn on the power, power is supplied to the various components of the interchangeable lens 2 and the camera body 3.

The nonvolatile memory 53 holds various kinds of information related to the camera body 3 (body information). This body information includes, for example, information related to the model, for identifying the camera body 3, such as the name of the manufacturer of the camera body 3, the date of manufacture, the model number, the version of software installed in the body microcomputer 12, and information related to firmware updates. Further, this body information may be stored in a memory unit 36 in the body microcomputer 12 instead of in the nonvolatile memory 53. The interchangeable lens 2 having body mount 80 is removably attached to a lens mount 70.

1.2: Interchangeable Lens

As shown in FIG. 1, the interchangeable lens 2 mainly comprises an imaging optical system L for forming an image of a subject, a focal adjuster 40 for performing focusing, an aperture adjuster 41 for adjusting the aperture, a lens image blur corrector 28, a lens microcomputer 20 serving as a lens controller for controlling the operation of the interchangeable lens 2, a nonvolatile memory 52, and a body mount 80 that can be attached to the lens mount 70. The lens image blur corrector 28 corrects image blur attributable to shaking of the camera system 1 by adjusting the optical path.

The focal adjuster 40 mainly comprises the focus lens group 24 that is provided drivably in a direction along the optical axis and that adjusts the focus by moving in a direction along the optical axis, and a focus lens group controller 25 for controlling the drive of the focus lens group 24.

The focus lens group controller 25 has a drive motor (not shown) such as a DC motor or an ultrasonic motor, and a drive mechanism (not shown) that converts the rotary motion of the drive motor into the linear motion of the focus lens group 24.

Figure 6:
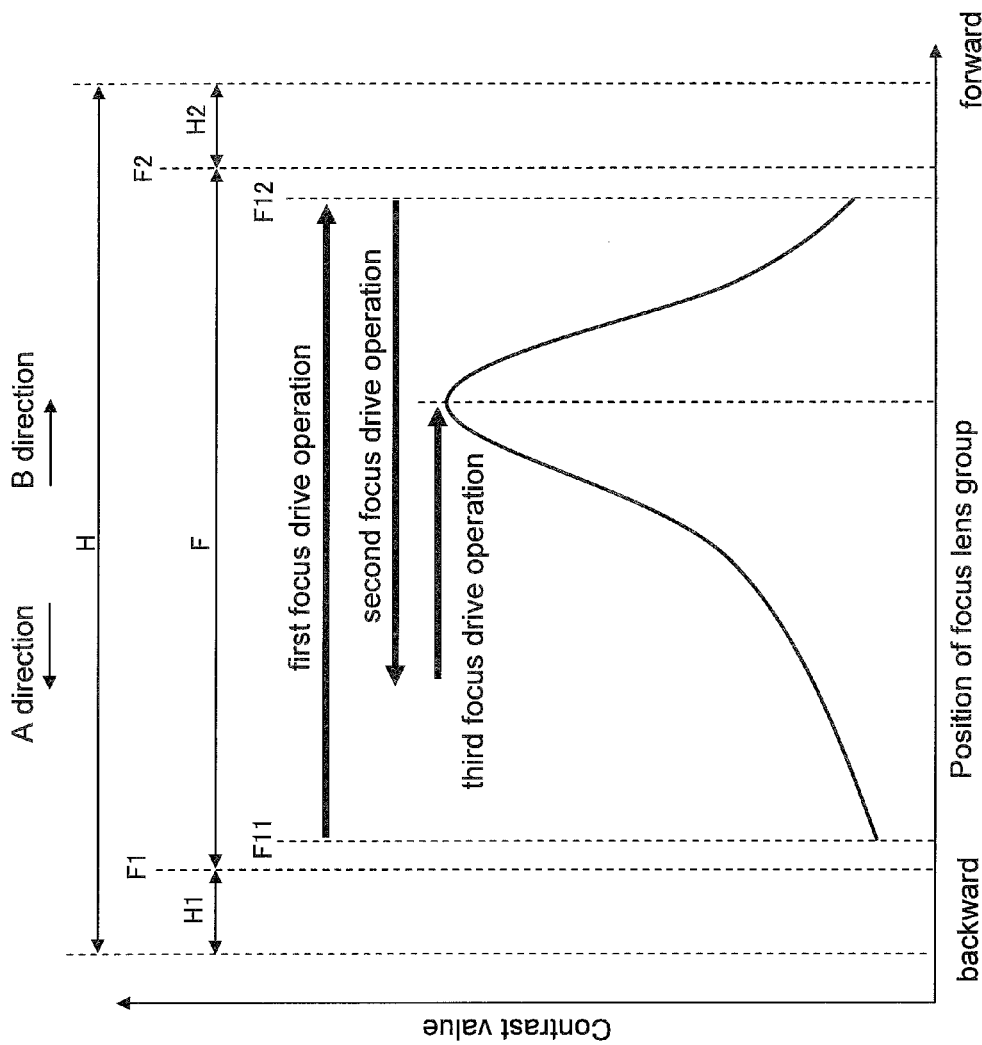
FIG. 6 is a diagram illustrating the operation of the focus lens in a contrast detection method.

The drive motor and drive mechanism make it possible for the focus lens group 24 to move in a direction along the optical axis within a standard range F from the nearest focal position F1 to the infinity focal position F2 (see FIG. 6). The standard range F is a range set as the standard for the interchangeable lens 2, and within the standard range F, the interchangeable lens 2 satisfies aspects of lens performance such as resolution, amount of peripheral light, and distortion.

The focus lens group 24 must be able to move forward and backward in the direction of the optical axis, sandwiching the focal position, for the sake of focal position detection by the contrast method discussed below. Accordingly, the movable range H of the focus lens group 24 has lens shift tolerance ranges H1 and H2 forward and backward beyond the above-mentioned standard range F. The movable range H is the range over which the focus lens group 24 is able to move, and is determined by the configuration of the drive mechanism of the focus lens group controller 25, for example. Thus, the focus lens group 24 is able to move in the direction of the optical axis within a movable range H that is wider than the standard range F.

The focus lens group controller 25 has a linear position sensor 25a serving as an absolute position detector, and an encoder 25b serving as a relative position detector.

The linear position sensor 25a is used to detect the position (absolute position) of the focus lens group 24 in the direction of the optical axis within the movable range H. The linear position sensor 25a makes use of a varistor, and utilizes the output voltage with respect to the change in resistance to acquire position information for the focus lens group 24.

The encoder 25b is a sensor for detecting the amount of movement of the focus lens group 24 in the direction of the optical axis, and is a rotary pulse encoder, for example. More precisely, the encoder 25b is able to detect the amount of rotation of the drive motor of the focus lens group controller 25. The amount of movement of the focus lens group 24 can be ascertained by detecting the amount of rotation of the drive motor. In addition to being the encoder 25b, the relative position detector can also be a photosensor, a MR element (magneto-resistance element), Hall element, a PSD (position sensitive detector), or the like.

The lens microcomputer 20 calculates the amount of movement of the focus lens group 24 on the basis of the output of the encoder 25b. This allows the relative position of the focus lens group 24 (the change in its position) to be ascertained.

Figure 9:
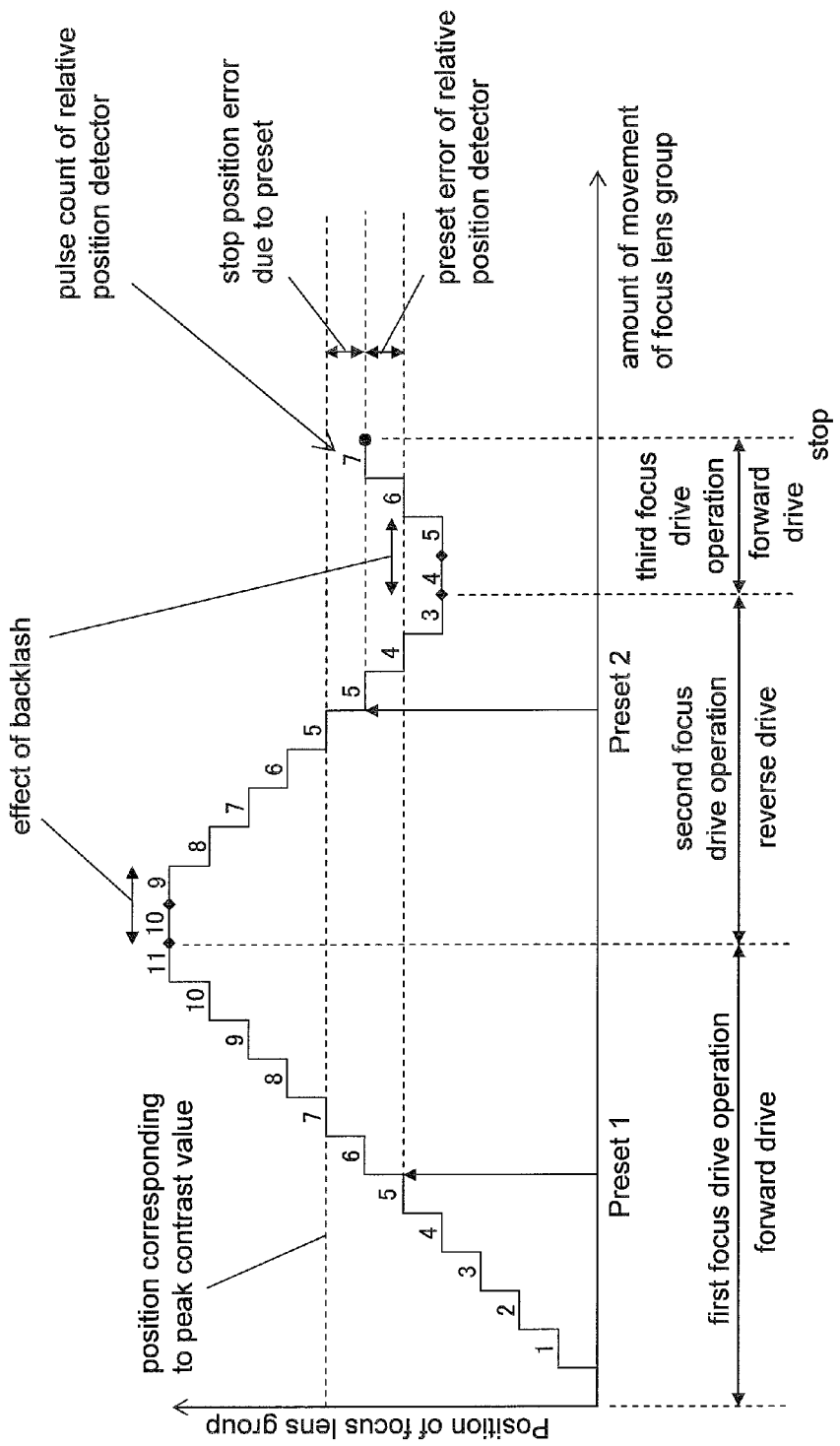
FIG. 9 is a diagram illustrating the effect of preset error in a contrast detection method.

The encoder 25b is a two-phase encoder, and alternately outputs binary signals at an equal pitch according to the position of the focus lens group 24 in the direction of the optical axis. With the encoder 25b, since the phase of the signals deviates, the movement direction can be detected in addition to the movement amount, as shown in FIG. 9. How the encoder 25b detects the movement direction will be discussed below.

The aperture adjuster 41 mainly comprises an aperture unit 26 for adjusting the aperture or opening, and an aperture controller 27 for controlling the operation of the aperture unit 26.

The lens image blur corrector 28 mainly comprises an image blur correction lens group 22 and an image blur correction unit drive controller 23. The image blur correction unit drive controller 23 is a unit that drives and controls the image blur correction lens group 22, and moves the image blur correction lens group 22 up, down, left, and right within a plane perpendicular to the optical axis of the imaging optical system L. Also, the amount of shake of the camera system 1 is detected by a shake detection unit 21. For example, the amount of movement of the image blur correction lens group 22 is decided by the lens microcomputer 20 on the basis of the amount of shake that is detected.

The lens microcomputer 20 is a control device serving as the functional center of the interchangeable lens 2, and is connected to the various components mounted in the interchangeable lens 2. More specifically, the lens microcomputer 20 is equipped with a CPU, ROM, and RAM, and can perform many different functions when programs held in the ROM are read into the CPU. Also, the body microcomputer 12 and the lens microcomputer 20 are electrically connected via electrical contacts (not shown) provided to the lens mount 70 and the body mount 80, respectively, which allows them to exchange information. Communication between these microprocessors may also be accomplished by optical communication or wireless electromagnetic waves. The lens microcomputer 20 is connected to the various components provided to the interchangeable lens 2.

The nonvolatile memory 52 holds various kinds of information related to the interchangeable lens 2 (lens information). This lens information includes, for example, information related to the model, for identifying the interchangeable lens 2, such as the name of the manufacturer of the interchangeable lens 2, the date of manufacture, the model number, the version of software installed in the lens microcomputer 20, and information related to firmware updates (lens specifying information); information related to whether or not the focal adjuster 40 is compatible with a contrast detection method; and so forth. The nonvolatile memory 52 can hold information that is sent from the body microcomputer 12. This information may be held in a memory unit in the lens microcomputer 20 instead of in the nonvolatile memory 52.

Automatic Autofocus Selection Function

With the camera system 1, either phase difference detection or contrast detection is selected as the autofocusing method, according to the specifications of the interchangeable lens 2 and the use intended by the user.

More specifically, as shown in FIG. 2, the body microcomputer 12 has a determination part 45 and a selector 46. The determination part 45 determines whether or not the focal adjuster 40 is compatible with the contrast detection unit 31 on the basis of lens information. The determination part 45 also determines whether or not the camera system 1 is in monitor photography mode. The selector 46 selects either contrast detection or phase difference detection as the autofocusing method on the basis of the determination result of the determination part 45. Specifically, the selector 46 automatically selects either the contrast detection unit 31 or the defocusing amount detection unit 5 as the focal detection unit.

As discussed above, the lens information includes information related to whether or not the focal adjuster 40 is compatible with a contrast detection method. More precisely, if the focal adjuster 40 is compatible with a contrast detection method, information to that effect is stored at a specific address in the lens information, and the body microcomputer 12 determines whether or not the focal adjuster 40 is compatible with a contrast detection method on the basis of the information stored in at a specific address.

For example, if the determination part 45 determines that there is compatibility, the selector 46 selects the contrast detection method, that is, selects the contrast detection unit 31 as the focal detection unit. In this case, focal detection during photography is carried out by the contrast detection unit 31. On the other hand, if the determination part 45 determines that there is incompatibility, the selector 46 selects the phase difference detection method, that is, selects the defocusing amount detection unit 5 as the focal detection unit. In this case, focal detection during photography is carried out by the defocusing amount detection unit 5.

For example, as shown in FIG. 3, a type A interchangeable lens is compatible with contrast detection as well as phase difference detection. A type B interchangeable lens is compatible only with phase difference detection. The lens information includes information such as "type A" or "type B" as the type of lens, and "1: compatible" or "0: incompatible" as information about compatibility with contrast detection. The focal detection method is selected on the basis of this information. For instance, with a type A interchangeable lens, the contrast detection method is selected if an image is to be captured in monitor photography mode. With a type B interchangeable lens, the phase difference detection method is selected regardless of the photography mode.

3: Operation of Camera System

Figure 4:
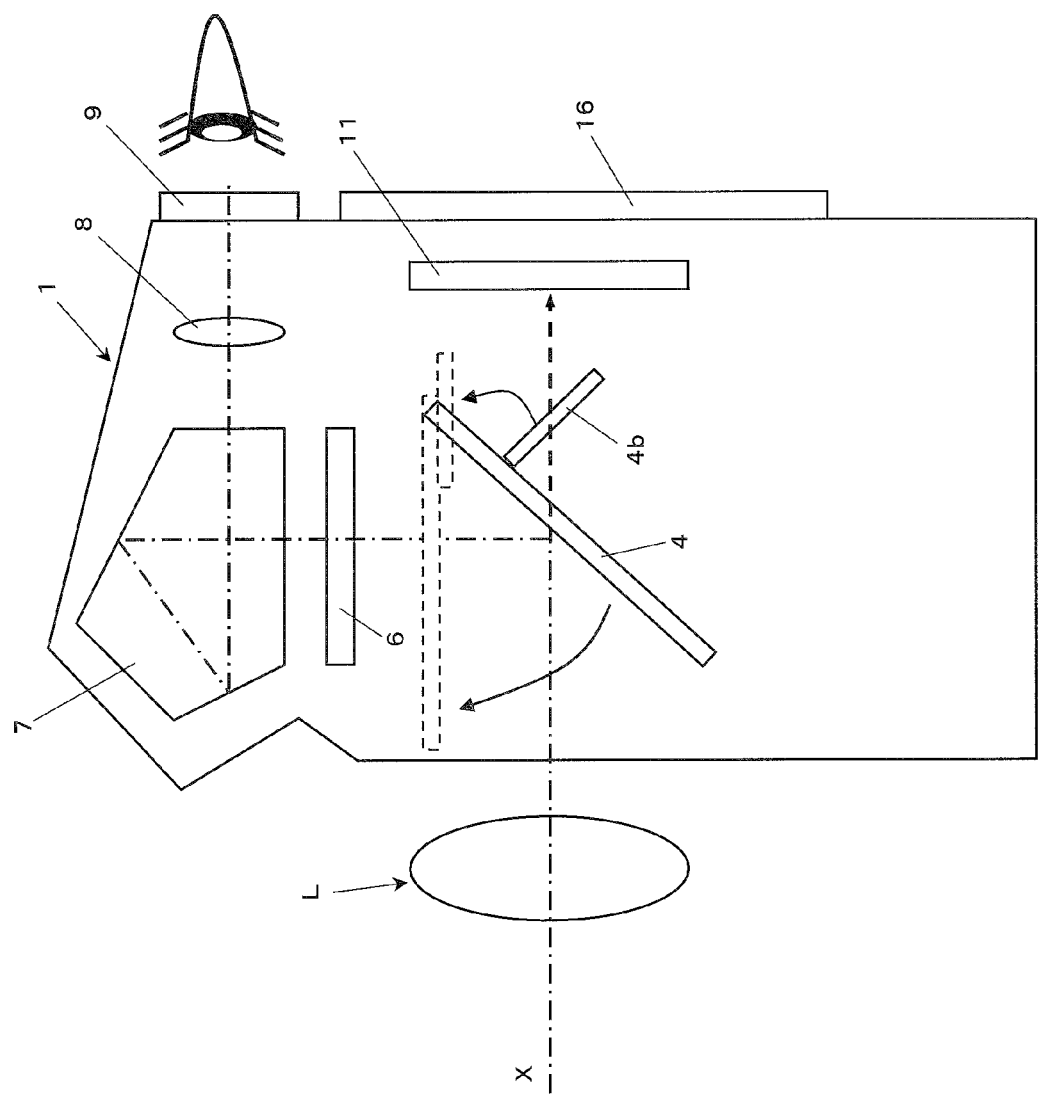
FIG. 4 is a concept diagram of imaging with the camera system 1.
Figure 5:
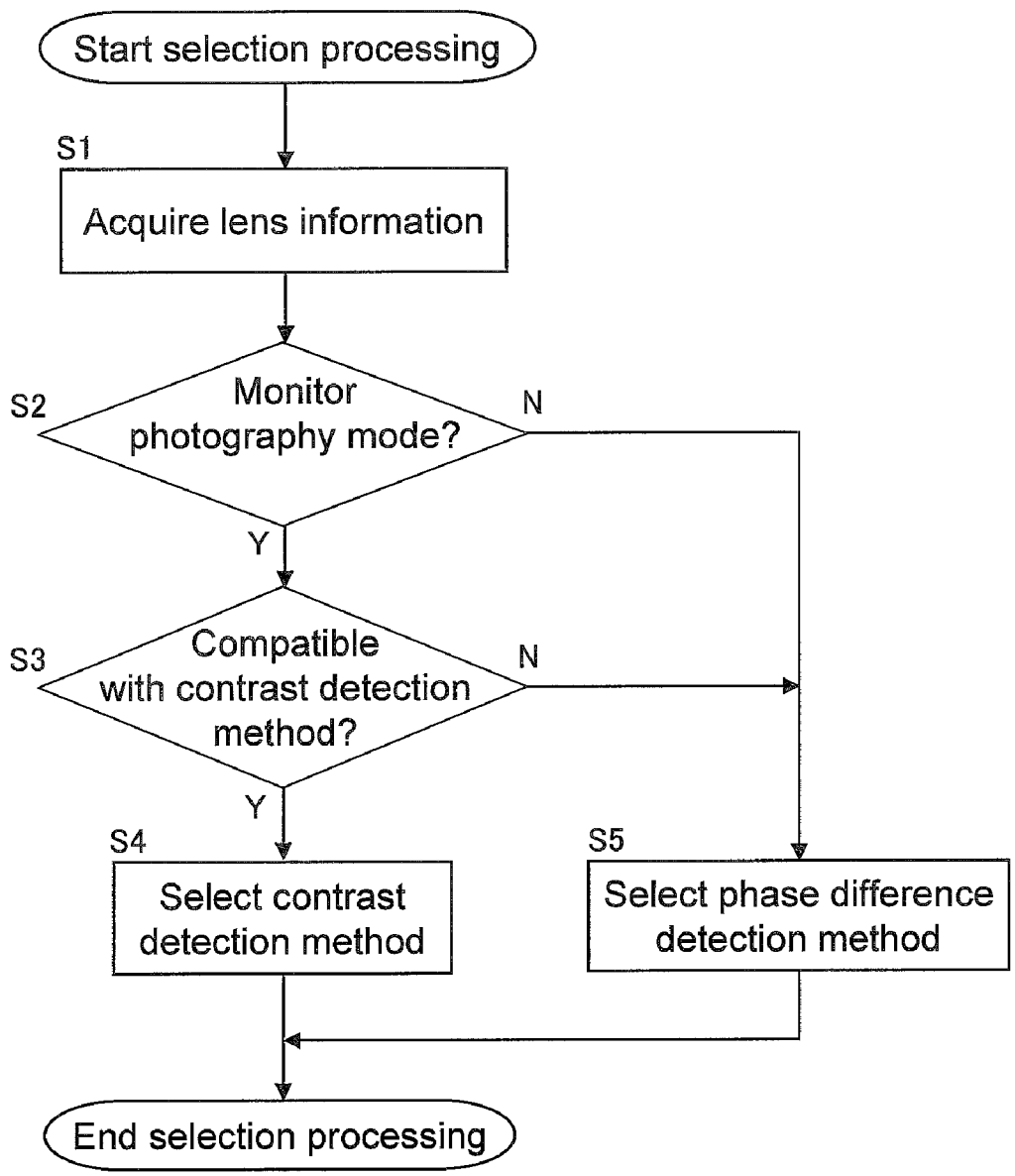
FIG. 5 is a flowchart of selection by the focal detection unit.

The operation of the camera system 1 during imaging will be described through reference to FIGS. 1 to 5. FIG. 4 is a concept diagram of imaging with the camera system 1. FIG. 5 is a flowchart of selection by the focal detection unit.

3.1: Viewfinder Photography Mode

As shown in FIGS. 1 and 4, in viewfinder photography mode in which the user looks through the viewfinder window 9 to capture an image, the main mirror 4a is disposed along the optical path. Accordingly, light from the subject (not shown) is transmitted through the imaging optical system L and incident on the main mirror 4a, which is a semitransparent mirror. Part of the light incident on the main mirror 4a is reflected by the main mirror 4a and is incident on the viewfinder screen 6, and the rest of the light is transmitted through the main mirror 4a and is incident on the sub-mirror 4b. The light incident on the viewfinder screen 6 forms a subject image. This subject image is converted by the pentaprism 7 into an erect image, which is incident on the eyepiece 8. This allows the user to observe an erect image of the subject through the viewfinder window 9. Also, the light incident on the sub-mirror 4b is reflected and is incident on the defocusing amount detection unit 5.

When the user presses the release button 50 halfway down, power is supplied to the body microcomputer 12 and the various units in the camera system 1, and the body microcomputer 12 and the lens microcomputer 20 are activated. The body microcomputer 12 and the lens microcomputer 20 are programmed so as to exchange information back and forth upon activation via the electrical contacts (not shown) of the lens mount 70. For instance, lens information related to the interchangeable lens 2 is sent from the memory unit 29 of the lens microcomputer 20 to the body microcomputer 12, and this lens information is held in the memory unit 36 of the body microcomputer 12. At this point, as shown in FIG. 5, the body microcomputer 12 also receives information related to whether or not the focal adjuster 40 is compatible with contrast detection (S1). After this, the determination part 45 determines whether or not the photography mode is monitor photography mode (S2). In the case of viewfinder photography mode, the main mirror 4a must be inserted into the optical path. Therefore, with viewfinder photography mode, the defocusing amount detection unit 5 is selected as the focal detection unit (S5).

Next, the amount of defocus (hereinafter referred to as the Df amount) is acquired by the defocusing amount detection unit 5 on the basis of the reflected light from the sub-mirror 4b. A command is sent from the body microcomputer 12 to the lens microcomputer 20 so that the focus lens group 24 will be driven by this Df amount. More specifically, the focus lens group controller 25 is controlled by the lens microcomputer 20 and the focus lens group 24 is moved by the Df amount. The Df amount can be reduced by repeating this focus detection and drive of the focus lens group 24. Once the Df amount is at or below a specific level, it is determined by the body microcomputer 12 that the system is focused, and the drive of the focus lens group 24 is stopped. After this, when the release button 50 is pressed all the way down by the user, a command is sent from the body microcomputer 12 to the lens microcomputer 20 so as to obtain an aperture value calculated on the basis of the output from a light sensor (not shown). The aperture controller 27 is controlled by the lens microcomputer 20, and the aperture is closed until the designated aperture is attained. Simultaneously with the designation of the aperture value, the quick return mirror 4 is retracted from the optical path X by the quick return mirror controller 32. Upon completion of this retraction, a command to drive the imaging sensor 11 is outputted from the imaging sensor controller 13, and the operation of the shutter unit 10 is indicated. The imaging sensor 11 is exposed by the shutter controller 14 for the length of time of the shutter speed calculated on the basis of the output from a light sensor (not shown).

Upon completion of this exposure, the imaging sensor controller 13 reads image data from the imaging sensor 11, and after specific image processing, image data is outputted through the body microcomputer 12 to the image display controller 15. As a result, the captured image is displayed on the liquid crystal monitor 16. Image data is held in a storage medium via the image recording controller 17 and the image recording and reproduction unit 18. Upon completion of the exposure, the quick return mirror 4 and the shutter unit 10 are reset to their initial positions by the body microcomputer 12. A command is issued from the body microcomputer 12 to the lens microcomputer 20 for the aperture controller 27 to reset the aperture to its open position, and reset commands are sent from the lens microcomputer 20 to the various units. Upon completion of this resetting, the lens microcomputer 20 notifies the body microcomputer 12 of the completion of resetting. After the body microcomputer 12 has received the reset completion information and a series of processing has been completed after the completion of exposure, it is confirmed that the release button has not been pressed, whereupon the body microcomputer 12 concludes the imaging sequence.

3.2: Monitor Photography Mode

Meanwhile, in monitor photography mode, in which the user captures an image while looking at the liquid crystal monitor 16, an optical image formed by the imaging optical system L is guided to the imaging sensor 11, so the main mirror 4a is retracted from the optical path. Accordingly, light from the subject (not shown) is transmitted by the imaging optical system L and is incident on the imaging sensor 11. At the imaging sensor 11, the optical image is converted into an image signal by opto-electrical conversion, and a video image of the subject is outputted to the liquid crystal monitor 16 on the basis of this image signal. This allows the user to capture an image while looking at the live video image of the subject.

However, when focal adjustment is performed using the defocusing amount detection unit 5, the main mirror 4a and the sub-mirror 4b need to be disposed along the optical path. This means that in performing focal detection, there is the risk that light to the imaging sensor 11 will be blocked, the live video image of the subject being shown on the liquid crystal monitor 16 will be interrupted, and the user will miss a photography opportunity.

In view of this, with the camera system 1, when in monitor photography mode and when the interchangeable lens 2 is compatible with contrast detection, the contrast detection method is selected as the focal detection method. More specifically, when the user presses the release button 50 halfway down, power is supplied to the various components. Lens information related to the interchangeable lens 2 is sent from the memory unit 29 of the lens microcomputer 20 to the body microcomputer 12, and this lens information is stored in the memory unit 36 of the body microcomputer 12. At this point, as shown in FIG. 5, the body microcomputer 12 also receives information related to whether or not the focal adjuster 40 is compatible with the contrast detection method (S1).

The determination part 45 of the body microcomputer 12 determines whether or not the photography mode is the monitor photography mode (S2). In this case, since the photography mode is the monitor photography mode, it is determined whether or not the focal adjuster 40 is compatible with contrast detection on the basis of the lens information (S3). As discussed above, the lens information includes information to the effect that the focal adjuster 40 is compatible with contrast detection. Therefore, the determination part 45 determines that the focal adjuster 40 is compatible with contrast detection. The contrast detection unit 31 is selected as the focal detection unit by the selector 46 on the basis of this determination result (S4).

In this case, the main mirror 4a is held in its retracted state by the quick return mirror controller 32, and a contrast value is detected on the basis of the image signal obtained by the imaging sensor 11. While the focus lens group 24 is being driven in the direction of the optical axis by the focus lens group controller 25, a contrast value is detected by the contrast detection unit 31. The position information about the focus lens group 24 from the focus lens group controller 25 and the contrast value from the contrast detection unit 31 are stored in the memory unit 36 of the body microcomputer 12, for example. As a result, the relation between the position of the focus lens group 24 and the contrast value can be ascertained.

In this case, the image at which the contrast value is at its peak is the image that is focused best. Therefore, the focus lens group 24 is finally driven by the focus lens group controller 25 to a position corresponding to the peak of the contrast value, and focal adjustment is concluded. Upon conclusion of the focal adjustment, subject image data is acquired by the imaging unit 71 just as in the viewfinder photography mode.

4: Contrast Detection Method

The contrast detection method used by the camera system 1 will now be described through reference to FIG. 6. FIG. 6 is a diagram illustrating the operation of the focus lens in this contrast detection method.

As shown in FIG. 6, with this contrast detection method, in detecting a contrast value, the focus lens group 24 moves in the direction of the optical axis between a detection start position F11 and a detection stop position F12. More specifically, first, the focus lens group 24 is driven by the focus lens group controller 25 in a B direction (to the right in FIG. 6) from the detection start position F11 to the detection stop position F12 (first focus drive operation). Here, a contrast value is detected at each position of the focus lens group 24 by the contrast detection unit 31. At this point position information for the focus lens group 24 from the focus lens group controller 25 and the contrast value from the contrast detection unit 31 are stored in the memory unit 36 of the body microcomputer 12. Also, the position of the focus lens group 24 corresponding to the contrast value is stored in the memory unit 36 of the body microcomputer 12.

Next, the focus lens group 24 is driven backward (A direction) by the focus lens group controller 25 from the detection stop position F12 so as to pass the position corresponding to the peak contrast value (second focus drive operation). When the movement direction of the focus lens group 24 changes, a phenomenon occurs whereby backlash (a gap formed between the teeth of gears) in the drive mechanism (not shown) of the focus lens group controller 25 allows the drive motor to rotate but prevents the focus lens group 24 from moving. Accordingly, immediately after the focus lens group 24 has changed its direction of movement, when the drive motor rotates, the pulse count of the encoder 25b changes, but the focus lens group 24 does not move because of backlash.

To reduce the effect of this backlash, the focus lens group 24 is driven by the focus lens group controller 25 so as to go past the peak contrast value (second focus drive operation), and the movement direction of the focus lens group 24 is switched again. At this point, any error in the position of the focus lens group 24 caused by backlash is cancelled out in the re-switching of the movement direction of the focus lens group 24. After this, the focus lens group 24 is driven by the focus lens group controller 25 to a position corresponding to the peak contrast value, and the focusing operation is ended (third focus drive operation). The decrease in positional accuracy caused by backlash can thus be suppressed by the first to third focus drive operations.

5: Position Detection Method

To improve the precision of focal adjustment, accurate position information about the focus lens group is necessary. How the position of the focus lens group 24 is detected by the focus lens group controller 25 will now be described. For example, in the case of phase difference detection, the amount of movement of the focus lens group 24 is calculated by the body microcomputer 12 on the basis of the Df amount obtained by the defocusing amount detection unit 5 and the current position information about the focus lens group 24. The focus lens group 24 is driven by the focus lens group controller 25 on the basis of the calculated movement amount, and the focus lens group 24 is disposed at the focal position. Accordingly, with a phase difference detection method, absolute position information about the focus lens group 24 is necessary in the operation of the defocusing amount detection unit 5, and the precision of this absolute position information affects the precision of the focal adjustment.

However, with a single lens reflex digital camera, since the drive motor that drives the focus lens group is not the stepping motor that is used in an ordinary digital camera, but instead a DC motor, ultrasonic motor, or the like, the absolute position of the focus lens group cannot be ascertained with a drive motor alone.

In view of this, an absolute position detector and a relative position detector are installed in the interchangeable lens of a single lens reflex digital camera. The absolute position detector can detect the absolute position of the focus lens group within its movable range. The relative position detector can detect the amount of movement of the focus lens group. As discussed above, with this embodiment, the linear position sensor 25a and the encoder 25b are installed in the interchangeable lens 2 as an absolute position detector and a relative position detector, respectively.

In general, an absolute position detector has relatively low resolution, but the resolution of a relative position detector is higher than the resolution of an absolute position detector. Therefore, basically the absolute position of the focus lens group is ascertained by the absolute position detector, and the pulse count of the relative position detector is preset to match the rise of the pulse of the absolute position detector. This means that the low resolution of the absolute position detector can be compensated for by the relative position detector by ascertaining the precise position with the relative position detector using the preset position as a reference.

Figure 7:
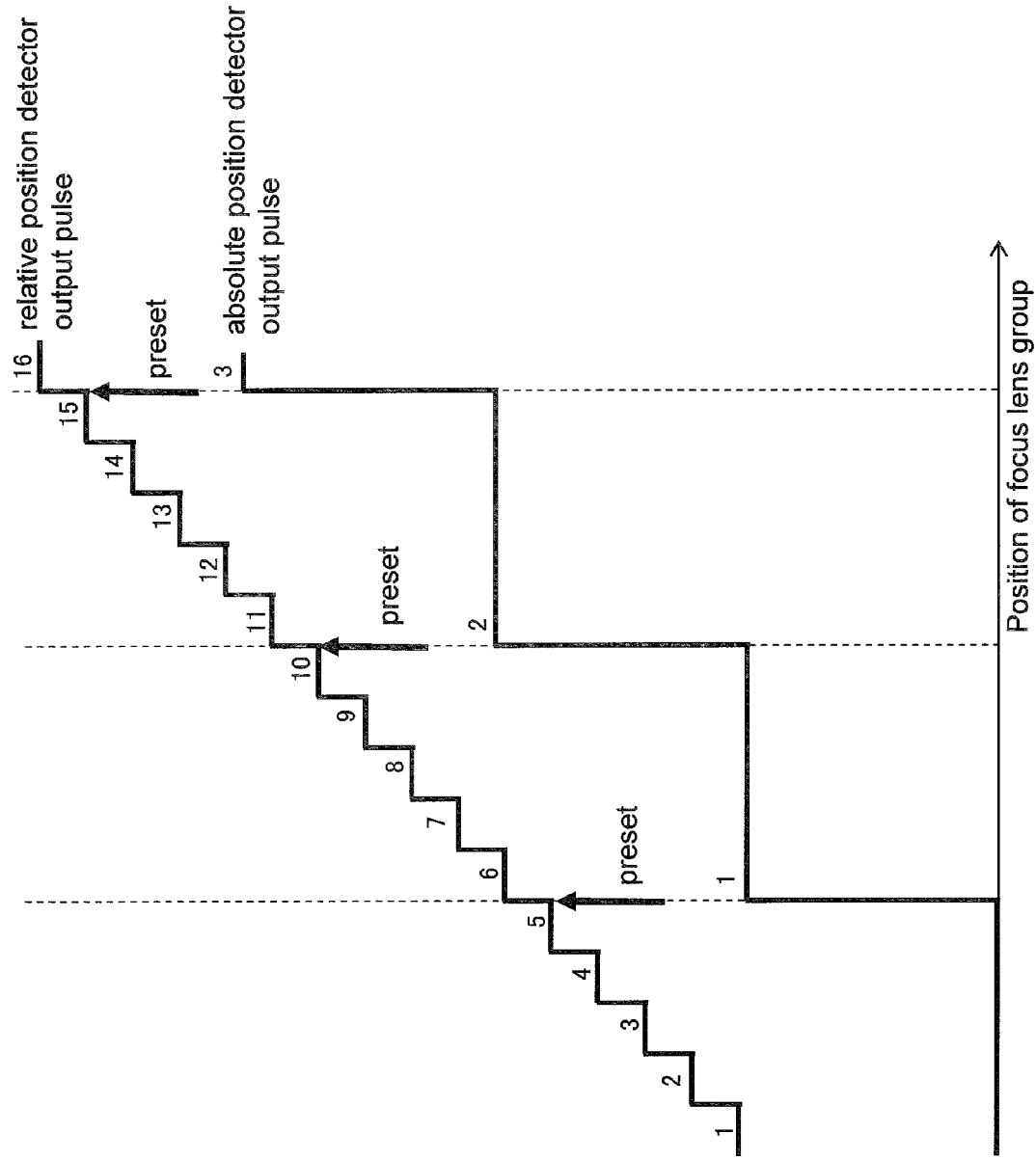
FIG. 7 is a diagram illustrating an example of the presetting of a pulse counter value in the relative position detector by the absolute position detector.

The presetting of the relative position detector will now be described. Position information for the focus lens group basically uses the output pulse of the absolute position detector as a reference, but the pulse count of the relative position detector is preset simultaneously with the rise of the pulse of the absolute position detector. For example, as shown in FIG. 7, the pulses of the relative position detector are automatically preset to 6, 11, and 16 with respect to the pulses 1, 2, and 3 of the absolute position detector. Consequently, the precise position of the focus lens group can be ascertained by the relative position detector using the pulses of the absolute position detector as a reference.

However, when focusing is performed by contrast detection method using this position detection method, preset error which occurs during the presetting of the relative position detector is a problem.

Figure 8:
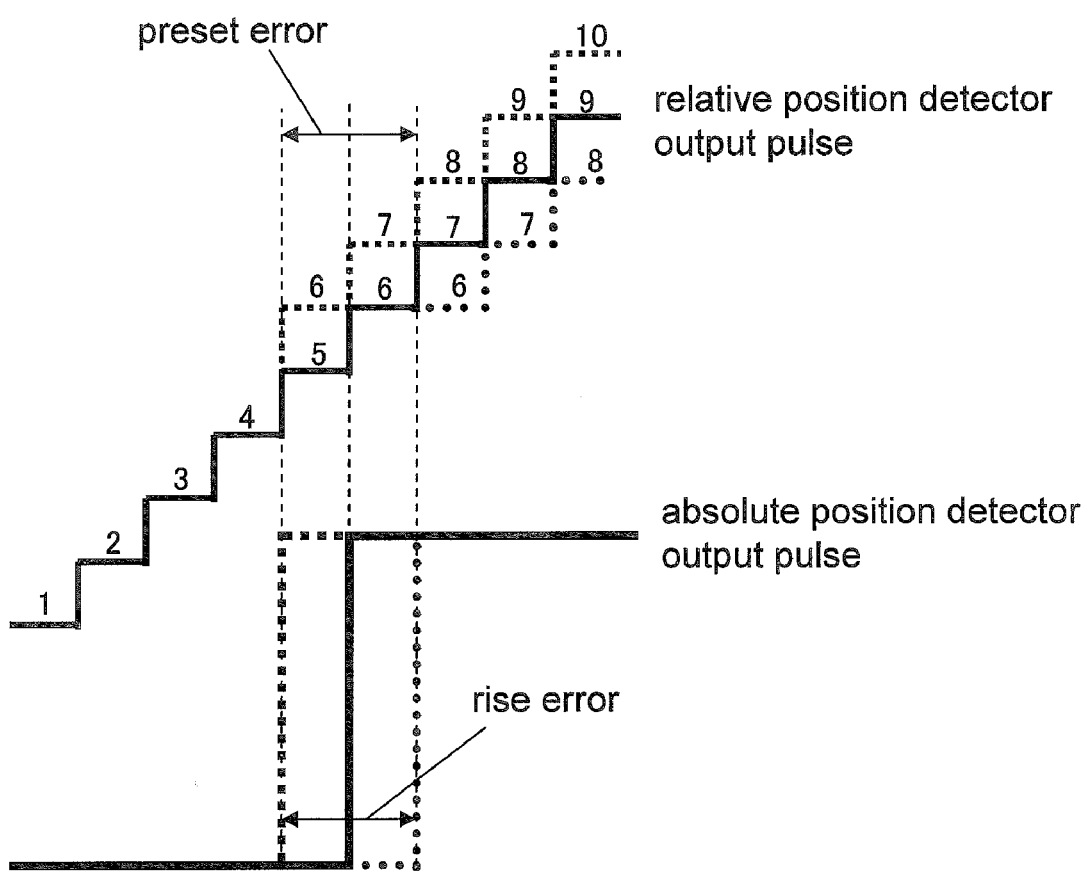
FIG. 8 is a diagram illustrating preset error.

The preset error will now be described through reference to FIG. 8. FIG. 8 is a diagram illustrating preset error.

In FIG. 8, the ideal state of the rise timing of pulses from the absolute position detector is indicated by the solid lines, while states in which the rise of the pulses is faster and slower than that of the ideal state are indicated by dotted lines. As shown in FIG. 8, in an ideal state, if the pulse count of the relative position detector is preset to "6," the pulse count of the relative position detector will increase continuously from before the pulse rise of the absolute position detector. However, if there is error in the timing of the pulse rise, the pulse count of the relative position detector ends up being forcibly preset to "6." Therefore, error occurs in the pulse count, and an accurate count of the number of pulses cannot be obtained. With phase difference detection, the command is updated so that the Df amount gradually decreases, so there is no major problem with this preset error.

With contrast detection, however, this present error greatly affects positioning precision. The effect that preset error has on positioning precision will be described through reference to FIG. 9. FIG. 9 shows the effect of preset error on positioning precision. The preset conditions are set as follows.

a) In the first and second focus drive operations, the focus lens group 24 is stopped after a pulse count of four after passing the position corresponding to the peak.

b) In presets 1 and 2, which are preset timing with the absolute position detector, the value of the relative position detector is preset to "6" on the way out (during the first focus drive operation), and to "5" on the way back (during the second focus drive operation).

(1) First Focus Drive Operation

First, the count of the number of pulses of the relative position detector is started from the start of drive of the drive motor. The pulse count of the relative position detector is preset to "6" at the timing of preset 1. At the point of preset 1, presetting is performed as set, and the count of pulses of the relative position detector goes continuously from the start of drive. The body microcomputer 12 determines that the position corresponding to the pulse count "7" corresponds to the peak contrast value when the pulse count is in the "8" position, and the pulse count "7" corresponding to the peak is stored in the memory unit 36 of the body microcomputer 12. According to the set conditions, the focus lens group 24 stops at the position of a pulse count of "11," which is four pulses ahead of the position corresponding to the peak contrast value.

(2) Second Focus Drive Operation

The drive motor is reversed to a pulse count of "3," which is four pulses (a set condition) back from the pulse count of "7" of the peak position detected in the first focus drive operation. Immediately after the rotational direction of the drive motor is switched, there is no change in the position of the focus lens group even if the drive motor reverses by two pulses, for example, due to backlash as mentioned above. Specifically, error occurs between the pulse count and the position of the focus lens group. For example, as shown in FIG. 9, the effect of backlash causes the pulse count to be "5" at the position corresponding to the peak contrast value, so there is deviation between the pulse count and the position corresponding to the peak contrast value.

Also, the pulse count is preset to "5" at the timing of preset 2. Here, preset error causes the pulse count to be preset at a different position from the position of the focus lens group at the timing of preset 1. Accordingly, the preset 2 causes the pulse count to be off by one pulse.

According to a set condition, when the pulse count reaches "3," the focus lens group controller stops the drive of the focus lens group.

(3) Third Focus Drive Operation

Next, the drive motor of the focus lens group controller begins forward rotation. Since backlash occurs immediately after the start of forward rotation, there is no change in the position of the focus lens group even if the drive motor rotates forward by two pulses. When backlash is eliminated, the focus lens group is driven by forward rotation of the drive motor.

According to a set condition, the focus lens group controller 25 stops the focus lens group 24 at the position of the pulse count "7," and the focal adjustment operation is concluded.

The effect of backlash can thus be reduced by inverting the rotation twice, but because of preset error, the focus lens group stops at a different position from the position corresponding to the peak contrast value detected in the first focus drive operation. Accordingly, with a contrast detection method, since the reciprocal motion of the focus lens group is repeated, the effect of preset error is magnified, and this lowers the positional precision of the focus lens group. Specifically, the precision of focal adjustment is diminished.

Figure 10:
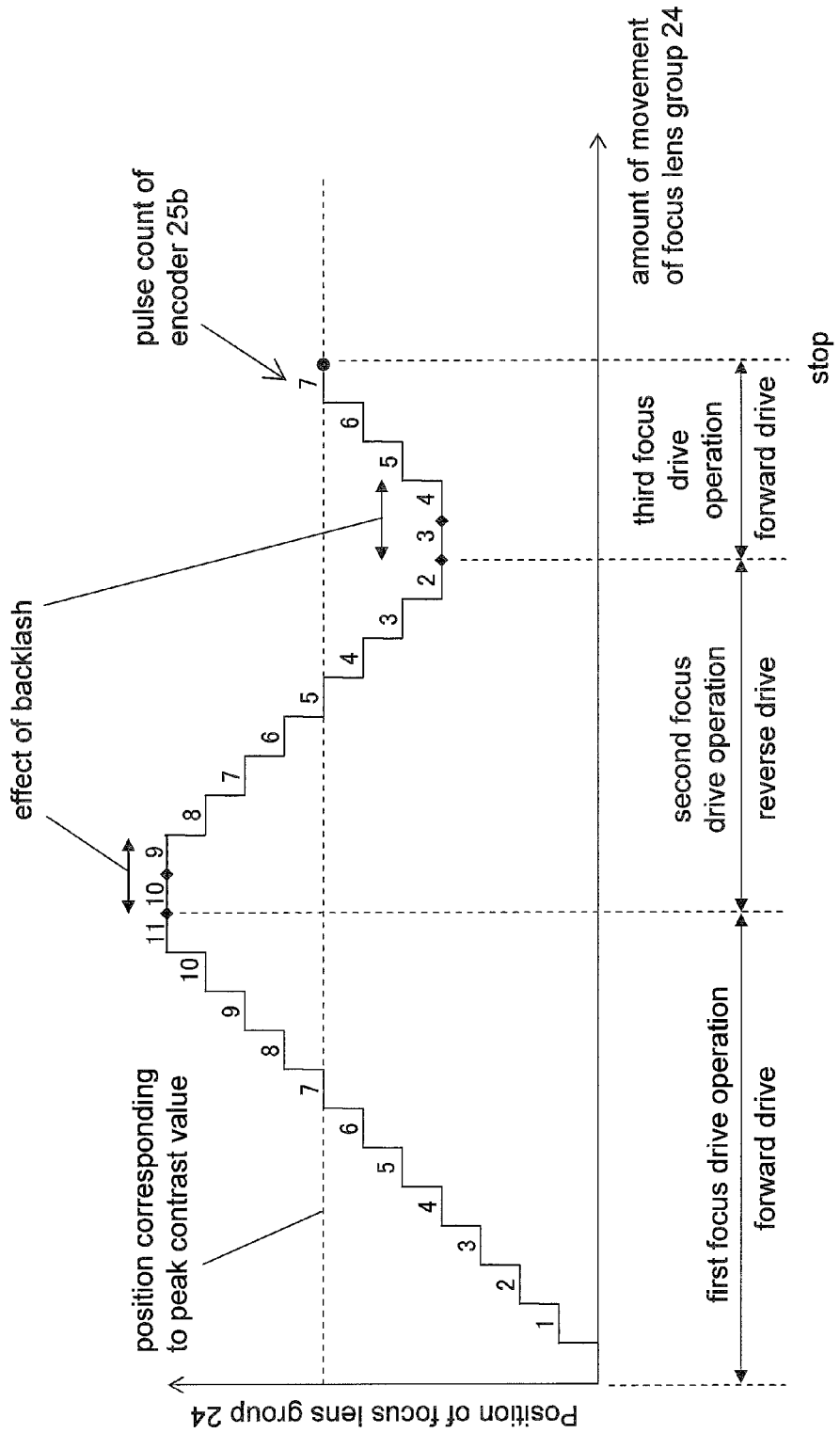
FIG. 10 is a diagram illustrating relative position detection by contrast detection method (no presetting)

In view of this, with the camera system 1, when focal adjustment is performed by contrast detection method, position detection is performed using just the encoder 25b, rather than using two position detectors, namely, the linear position sensor 25a and the encoder 25b, as with a conventional method. FIG. 10 shows an example of the operation of the camera system 1 when just the encoder 25b is used.

As shown in FIG. 10, in this case there is no presetting by the linear position sensor 25a, and pulse information can be ascertained for the encoder 25b at all times. Accordingly, error is less likely to occur in the pulse count, and the focus lens group 24 is positioned accurately at the position corresponding to the peak contrast value detected in the first focus drive operation. Thus performing focal adjustment by contrast detection method using only the encoder 25b eliminates the effect of preset error during focal adjustment. Consequently, positioning precision of the focus lens group 24 is enhanced, and focal adjustment is more precise.

6: Drive Direction Detection Method

Figure 11:
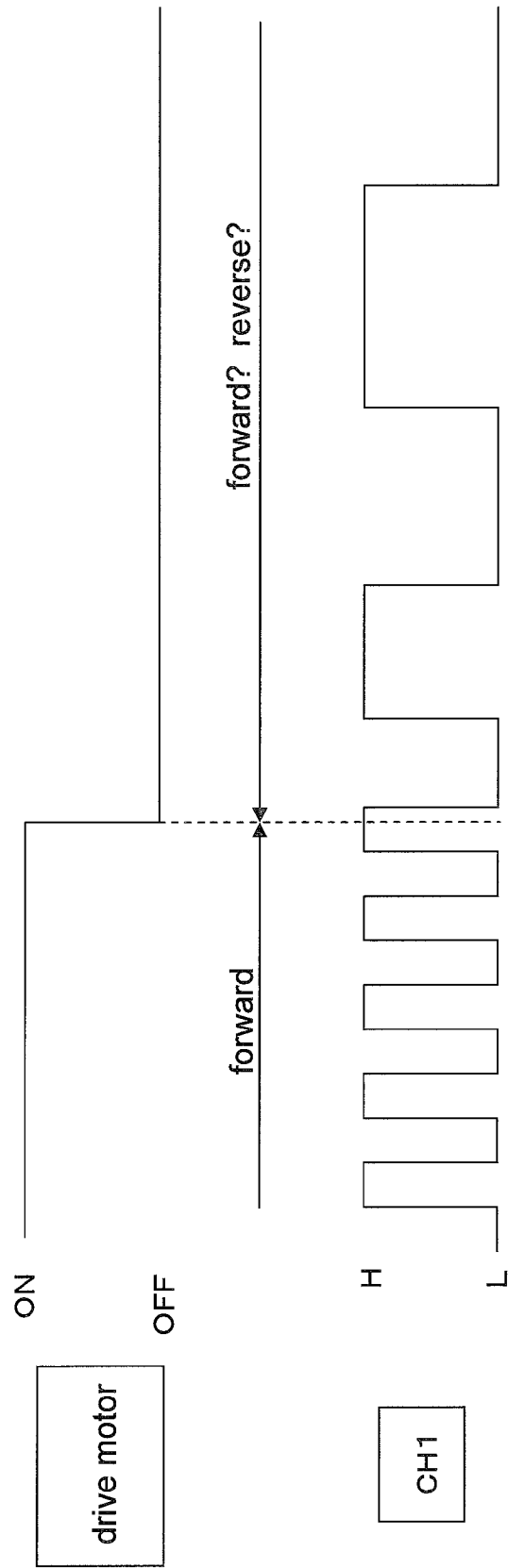
FIG. 11 is a diagram illustrating determination of the drive direction using the relative position detector (single-phase)

Because it is two-phase, the encoder 25b is also able to determine the drive direction (forward or reverse). FIG. 11 is a diagram illustrating the situation when the encoder 25b is single-phase, and FIG. 12 is a diagram illustrating the situation when the encoder 25b is two-phase.

As shown in FIG. 11, when the encoder 25b is single-phase, it can be determined whether the drive motor is rotating forward or in reverse from the input command to the motor during rotation. Therefore, when a signal is inputted to the drive motor, the drive direction and the amount of rotation of the drive motor, that is, the movement amount and movement direction of the focus lens group 24, can be determined from the output pulse from the encoder 25b and this input signal.

Nevertheless, if the drive motor comes to a stop during inversion, momentum will keep the drive motor from stopping right away even though the drive motor input signal stops, and this momentum will cause the drive motor to rotate slightly before stopping. Here, the drive motor does not necessarily always rotate in the same direction until the stop of rotation, and it is also possible that it will rotate in reverse due to the effect of the drive mechanism. Therefore, when the encoder 25b is single-phase, if there is no input signal to the drive motor, it is possible that the drive direction of the drive motor cannot be detected and error will occur in the pulse count.

Figure 12:
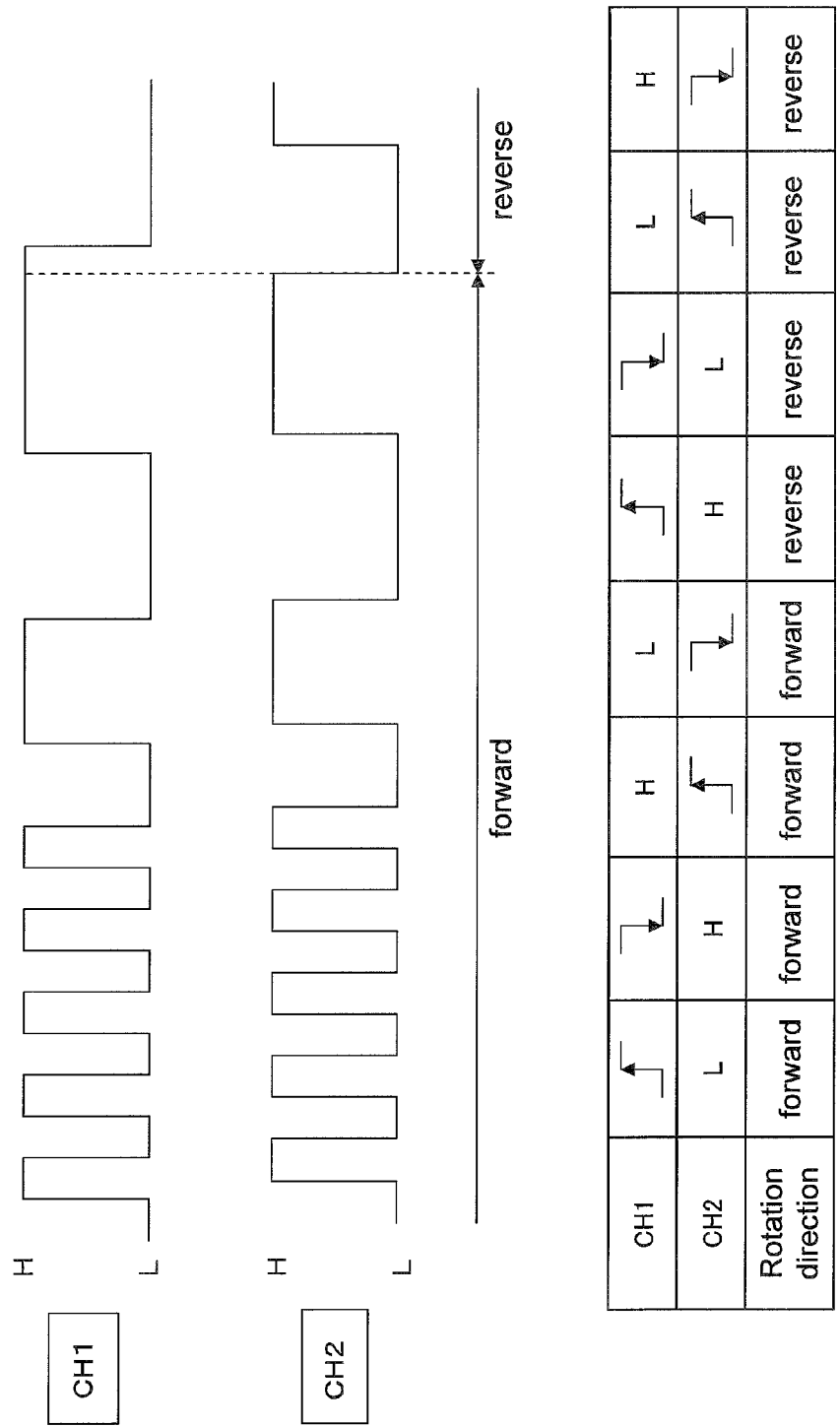
FIG. 12 is a diagram illustrating determination of the drive direction using the relative position detector (two-phase)

As shown in FIG. 12, with this camera system 1, the encoder 25b is two-phase. When the encoder 25b is two-phase, regardless of a motor input signal, the rotation direction of the motor can always be ascertained from the relation between the CH1 pulses and the CH2 pulses. For example, as shown in FIG. 12, when the CH2 pulses are low in a change of the CH1 pulses from low to high, the rotation direction of the drive motor is forward. When the CH2 pulses are high in a change of the CH1 pulses from high to low, the rotation direction of the drive motor is reverse. Thus, by using a two-phase encoder 25b, the movement amount and movement direction of the focus lens group 24 can be ascertained accurately, and there will be less error between the pulse count and the position information about the focus lens group 24. Specifically, using a two-phase encoder 25b raises focal adjustment precision when the contrast detection method is selected.

7: Effects

The effects obtained with the camera system 1 are as follows.

(1)

With this camera system 1, the selector 46 of the body microcomputer 12 determines whether or not the interchangeable lens 2 (more precisely, the focal adjuster 40) is compatible with a contrast detection method on the basis of lens information. The selector 46 selects either the contrast detection method or the phase difference detection method on the basis of this determination result. Thus, with this camera system 1, the focal detection method is automatically detected according to the specifications of the interchangeable lens 2.

For instance, when the photography mode is the monitor photography mode, and the interchangeable lens 2 is compatible with the contrast detection method, the selector 46 selects contrast detection as the focal detection method. Accordingly, there is no need to dispose the quick return mirror 4 in the optical path during focal adjustment, as with phase difference detection. Consequently, in monitor photography mode in which the subject is viewed on the liquid crystal monitor 16, focal adjustment can be performed without interrupting the video image of the subject, and this makes the monitor photography mode more convenient to use.

Also, with the camera system 1, when the determination part 45 determines that the interchangeable lens 2 is not compatible with the contrast detection method, the selector 46 selects phase difference detection as the focal detection method. Consequently, even if the interchangeable lens 2 is not compatible with contrast detection, focal adjustment can be performed by phase difference detection.

(2)

With this camera system 1, the encoder 25b is two-phase, and the drive direction and the amount of rotation of the drive motor can be detected from the output pulses of the encoder 25b. As a result, if position detection is performed with just the encoder 25b by contrast detection method, there will be no preset error, unlike when position detection is performed using both the linear position sensor 25a and the encoder 25b.

Thus using a position detector capable of detecting the movement amount and movement direction of the focus lens group 24 eliminates the occurrence of present error and improves position detection precision. Consequently, focal adjustment precision can be increased in the contrast detection method.

8: Other Embodiments

The single lens reflex camera system, camera body, and interchangeable lens according to the present invention are not limited to or by the embodiment given above, and various changes and modifications are possible without departing from the gist of the present invention.

(1)

In the embodiment given above, when monitor photography mode was used and the interchangeable lens 2 was compatible with contrast detection method, contrast detection was selected as the focal detection method. However, when the interchangeable lens 2 is compatible with contrast detection method, regardless of whether or not the photography mode is the monitor photography mode, contrast detection may be selected as the focal detection method at the start of photography preparations. Also, when the contrast detection method has been selected and the photography mode is not monitor photography mode, the system may switch to monitor photography mode and the quick return mirror 4 retracted from the optical path X by the quick return mirror controller 32.

Figure 13:
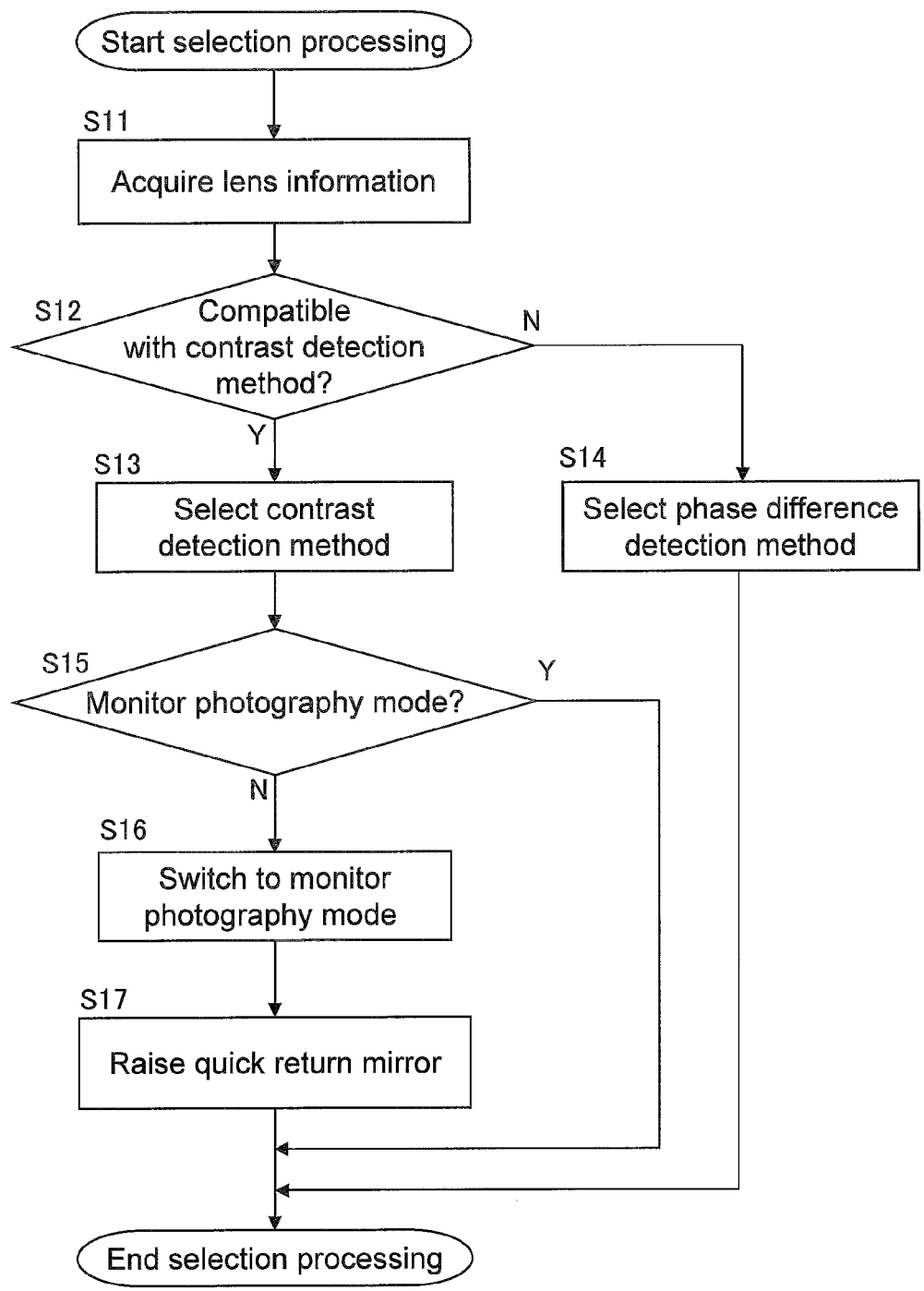
FIG. 13 is a flowchart of selection by the focal detection unit in another embodiment.

More specifically, when the user switches on the power to the camera system 1, power is supplied to the various components. As shown in FIG. 13, selection of the focal detection method begins at this point. Lens information related to the interchangeable lens 2 is sent from the memory unit 29 of the lens microcomputer 20 to the body microcomputer 12, and this lens information is stored in the memory unit 36 of the body microcomputer 12. At this point, as shown in FIG. 5, the body microcomputer 12 also receives information related to whether or not the focal adjuster 40 is compatible with the contrast detection method.

The determination part 45 of the body microcomputer 12 determines whether or not the focal adjuster 40 is compatible with contrast detection on the basis of the lens information (S12). As discussed above, the lens information includes information to the effect that the focal adjuster 40 is compatible with contrast detection. Therefore, the determination part 45 determines that the focal adjuster 40 is compatible with contrast detection. The selector 46 then selects the contrast detection unit 31 as the focal detection unit on the basis of this determination result (S13). If it is determined on the basis of the lens information that the focal adjuster 40 is not compatible with contrast detection, the selector 46 selects phase difference detection as the focal detection unit (S14), and the selection processing is concluded.

When the contrast detection method is selected, the determination part 45 of the body microcomputer 12 determines whether or not the photography mode is the monitor photography mode (S15). If the determination part 45 determines that the photography mode is the monitor photography mode, the selection processing is concluded. In this case, the main mirror 4a is held in its retracted state by the quick return mirror controller 32. On the other hand, if the determination part 45 determines that the photography mode is not the monitor photography mode (S15), the mode switches to the monitor photography mode (S16). More specifically, the quick return mirror 4 is retracted from the optical path X by the quick return mirror controller 32 (S17).

(2)

In the embodiment given above, the focal detection method was automatically selected by the selector 46. However, it is also conceivable that the focal detection method will be selected manually by the user. For example, the constitution may be such that the user can select the focal detection method by using a control switch (not shown), so that the user can select the focal detection method manually. In this case, the preferred focal detection method can be selected according to the application, such as still or moving pictures, and this makes the camera system 1 more convenient to use.

(3)

In the embodiment given above, the encoder 25b was employed as the relative position detector, but the relative position detector is not limited to this. For instance, in addition to being the encoder 25b, the relative position detector may be a photosensor, a MR element (magneto-resistance element), a Hall element, a PSD (position sensitive detector, or the like.

(4)

The selector 46 may select the first focal detector when the focus lens group 24 has the lens shift tolerance range H1, in which it can move forward and backward in the optical axis direction beyond the standard range F from the nearest focal position F1 to the infinity focal position F2.

(5)

The selector 46 may select the first focal detector when the focus lens group 24 has the lens shift tolerance range H1, in which it can move forward and backward in the optical axis direction beyond the standard range F from the nearest focal position F1 to the infinity focal position F2, and the relative position detector of the interchangeable lens can determine the movement direction of the focus lens group 24.

(6)

The selector 46 may select the first focal detector when the focus lens group 24 has the lens shift tolerance range H1, in which it can move forward and backward in the optical axis direction beyond the standard range F from the nearest focal position F1 to the infinity focal position F2, and the relative position detector is a two-phase encoder.

Industrial Applicability

With the single lens reflex camera system according to the present invention, autofocusing is possible by contrast method. Therefore, the present invention is useful in the field of optical devices.

The invention claimed is:

1. A camera body used in a camera system for capturing an image of a subject and to which an interchangeable lens including an imaging optical system can be attached, comprising:
a body mount to which the interchangeable lens can be attached;
an imaging unit configured to convert an optical image of the subject formed by the imaging optical system into an image signal;
a movable mirror configured to be in a first state of being positioned in an optical path between the imaging optical system and the imaging unit, and in a second state of being positioned outside of the optical path;
an image displaying unit configured to display an image on a basis of the image signal generated by the imaging unit; and
a body controller configured to control the image displaying unit to display a real-time image based on the image signal generated by the imaging unit during a monitor photography mode in which the movable mirror is in the second state;
the body controller configured to differ controlling to perform autofocusing during the monitor photography mode, in accordance with whether or not the interchangeable lens attached to the body mount includes a lens shift tolerance range arranged to allow movement of a focus lens group back and forth in an optical axis direction beyond a standard range from a nearest focal position to an infinity focal position.

2. The camera body according to claim 1, wherein,
the body controller is configured to perform the autofocusing during the monitor photography mode by detecting a contrast value from the image signal and detecting a focal state of the optical image on a basis of the contrast value.

* * * * *